UNITED STATES PATENT OFFICE 2,331,755

SILVER HALIDE EMULSION FOR COLOR PHOTOGRAPHY

Richard V. Young, Rochester, N. Y., assignor to Eastman Kodak Company, Rochester, N. Y., a corporation of New Jersey No Drawing. Application December 23, 1940, Serial No. 371,399. In Great Britain January 18, 1940

6 Claims. (Cl. 95—7)

This invention relates to color photography and more particularly to non-diffusing resinous dyes for use in color photography.

In photographic color processes it has been suggested that color images may be produced in sensitive multilayer coatings of dyed gelatin by bleaching out dyes with hydrosulfite or stannous chloride in the area of silver particles resulting from the development of a latent image. Such a process has been described in Christensen U. S. Patent No. 1,517,049 and other more recent patents. It is important in this method of color development that the dyes used for coloring the sensitive gelatin layer be substantially non-diffusible in order that they do not wander from the layer and impart undesirable color to adjacent layers. One method of accomplishing this is known to the art and consists in precipitating dyes in emulsion layers by means of appropriate reagents.

One object of the present invention is to provide sensitive emulsion layers with non-diffusing dyestuffs. Another object is to provide a method for preparing more non-diffusible dyestuffs for these purposes. A further object is to provide an improved photographic element for use in color photography having superposed emulsion layers containing dyestuffs fast to diffusion.

These objects are accomplished in the present invention by adding to a sensitive silver halide emulsion a non-diffusible resinous dyestuff formed by the reaction of an aldehyde or aldehyde-forming compound with an azo dye having at least one ortho or para position not substituted.

The non-diffusible resinous dyestuffs of this invention are prepared by means of the adaption of the well known reaction of a phenol or aryl amine with an aldehyde. Water-soluble dyes which are normally not fast to diffusion in emulsion layers and are reducible with hydrosulfite or alkaline stannous chloride are reacted with an aldehyde such as formaldehyde or with aldehyde-forming compounds such as hexamethylenetetramine or paraformaldehyde. The dyes which best lend themselves to this reaction and which are very useful in color photography are the azo dyes characterized by the fact that they contain a phenolic, naphtholic or aryl amine residue, one or more ortho or para positions of which are not substituted. Also it is preferable that the dyes contain no negative substituents such as carboxyl, nitro, or sulfonic acid in the reactive phenolic, naphtholic or aryl amine residue, since the condensation is markedly slowed down by the presence of these substituents. However, the presence of these negative substituents in another portion of the dye molecule is generally without effect. For example, in a dye containing a 1,8-dihydroxynaphthalene-4-sulfonic acid residue the presence of the sulfonic group in the position para to one hydroxyl does not markedly influence the course of the reaction of an aldehyde at the ortho and para positions relative to the other hydroxyl. Dyes which I react with an aldehyde are those readily reducible with bleaching solutions such as hydrosulfite or alkaline stannous chloride.

The following dyes are representative of the well known dyes which may be caused to react with aldehydes or aldehyde forming compounds to give water-soluble resinous non-diffusing dyes according to my invention.

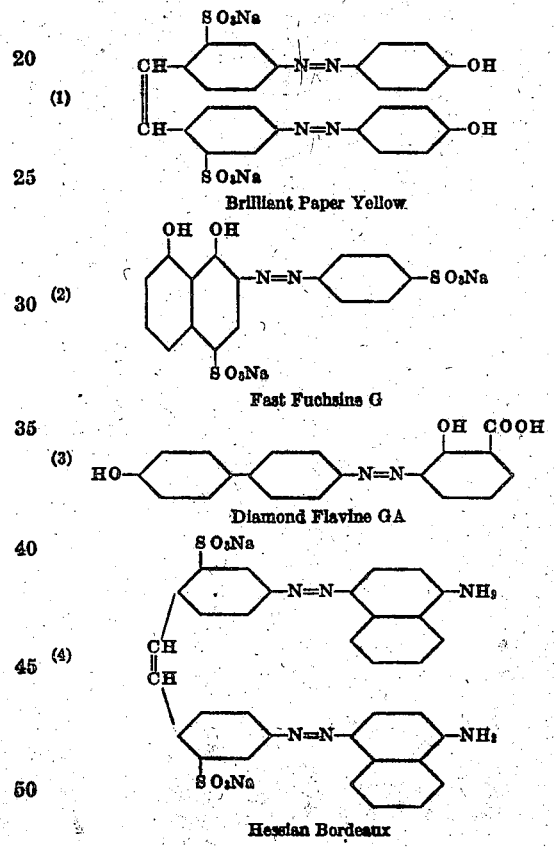

The resinous dyes of my invention may be prepared by reacting formaldehyde with a dye, the preferred method being to reflux an alkaline solution of the dye with an excess of 35-40% formalin solution for several hours and until it is determined by diffusion tests of the product in gelatin layers that the simple dye has been converted to the resinous state. In an alternative method I reflux a diethyleneglycolmonobutyl ether solution of the dye with hexamethylenetetramine in which case the dye condenses with the aldehyde liberated to form the resinous dye of my invention. In a similar manner I treat a dye with paraformaldehyde.

Where a large number of dye molecules are so combined the product may be represented by the following molecular structure:

$$D-CH_2-(D-CH_2)_n-D$$

where D represents the dye molecule and the dye is condensed with formaldehyde, $n$ being a large integer.

Photographic emulsions are prepared in the usual manner using the resinous dye of this invention. To a solution of a colloidal material such as gelatin are added silver nitrate and a soluble alkali metal halide salt such as potassium bromide, and the resinous dye of the invention. The amount of resinous dye which is added varies with the color saturation of the particular resinous dye in use. The resulting photographic emulsion which contains a sensitive silver halide salt and the resinous dye is coated upon a support in the usual way. Multi-layer photographic elements are prepared by superposing several emulsion layers containing sensitive silver halide and different non-diffusible resinous dyes. Instead of gelatin the carrier for the emulsions may consist of other colloidal materials such as cellulose esters or natural or synthetic resins.

The photographic emulsions which I describe are processed by the well known method of catalytically bleaching out the coloring material in the area of the silver particles deposited by negative processing, followed by the removal of the negative silver.

A bleaching solution which is suitable for the catalytic bleaching of emulsions containing the resinous dyes of the invention is one having the following composition.

| | |
|---|---|
| Stannous chloride | gm 8 |
| Water | cc 100 |
| Sodium hydroxide (10% solution) | cc 100 |

This bleach bath has been described in more detail and with variations in Seymour U. S. Patent No. 2,184,022. Another suitable bleach bath is

| | |
|---|---|
| Sodium thiocyanate | g 10 |
| Potassium bromide | g 1 |
| 2,3-dimethylquinoxaline | g 0.01 |
| Hydrochloric acid (conc.) | cc 10 |
| Water to | cc 100 | and the following solution

| | |
|---|---|
| Thiourea | g 1 |
| 2-hydroxy-3-aminophenazine | g 0.005 |
| Hydrochloric acid (conc.) | cc 5 |
| Water to | cc 100 |

A suitable solution for removing the negative silver from a film is one having the following composition:

| | |
|---|---|
| Potassium ferricyanide | gm 50 |
| Ammonium hydroxide 28% | cc 2½ |
| Potassium bromide | gm 5 |
| Water to | cc 1000 |

My invention is capable of numerous variations as other dyes besides those mentioned may be caused to form resinous dyestuffs by reaction with an aldehyde. In photographic color processes utilizing the bleaching method of producing dye images I am limited to those dyes which will react with an aldehyde and the condensation products of which are bleachable in a known manner. I may however use these non-diffusible resinous dyes as constituents of light absorbing filter layers in this and other color processes.

It is to be understood that my invention is to be limited only by the scope of the appended claims.

What I claim is new and wish to secure by Letters Patent of the United States is:

1. The method of preparing a light-sensitive photographic emulsion for the bleach-out process of color photography which comprises uniformly dispersing in a silver halide emulsion a non-coupling non-diffusing water-soluble resinous dye formed by union of a formeldehyde with an azo dye having a group selected from the class consisting of hydroxyl and amino groups, and capable of being bleached in the region of a silver image, a position other than meta, with respect to said groups, being unoccupied prior to said reaction, the coupling of the aldehyde with the azo dye occurring in said unoccupied position.

2. The method of preparing a light-sensitive photographic emulsion for the bleach-out process of color photography which comprises uniformly dispersing in a silver halide emulsion a non-coupling non-diffusing water-soluble resinous dye formed by union of formaldehyde with an azo dye having a group selected from the class consisting of hydroxyl and amino groups, and capable of being bleached in the region of a silver image, a position other than meta, with respect to said groups, being unoccupied prior to said reaction, the coupling of the aldehyde with the azo dye occurring in said unoccupied position.

3. The method of preparing a light-sensitive photographic emulsion for the bleach-out process of color photography which comprises uniformly dispersing in a silver halide emulsion a non-coupling non-diffusing water-soluble resinous dye formed by union of a formaldehyde with an azo dye having a hydroxyl group, and capable of being bleached in the region of a silver image, a position other than meta, with respect to said group, being unoccupied prior to said reaction, the coupling of the aldehyde with the azo dye occurring in said unoccupied position.

4. The method of preparing a light-sensitive photographic emulsion for the bleach-out process of color photography which comprises uniformly dispersing in a silver halide emulsion a non-coupling non-diffusing water-soluble resinous dye formed by union of a formaldehyde with an azo dye having an amino group, and capable of being bleached in the region of a silver image, a position other than meta, with respect to said group being unoccupied prior to said reaction, the coupling of the aldehyde with the azo dye occurring in said unoccupied position.

5. A light-sensitive photographic emulsion for the bleach-out process of color photography, comprising a silver halide emulsion containing a uniform dispersion of a non-coupling non-diffusing water-soluble resinous dye formed by union of a formaldehyde with an azo dye having a group selected from the class consisting of hydroxyl and amino groups, and capable of being bleached in the region of a silver image, a position other than meta, with respect to said groups, being unoccupied prior to said reaction, the coupling of the aldehyde with the azo dye occurring in said unoccupied position.

6. A light-sensitive photographic emulsion for the bleach-out process of color photography, comprising a silver halide emulsion containing a uniform dispersion of a non-coupling non-diffusing water-soluble resinous dye formed by union of formaldehyde with an azo dye having a group selected from the class consisting of hydroxyl and amino groups, and capable of being bleached in the region of a silver image, a position other than meta, with respect to said groups, being unoccupied prior to said reaction, the coupling of the aldehyde with the azo dye occurring in said unoccupied position.

RICHARD V. YOUNG.